US007818966B2

(12) United States Patent
Pack et al.

(10) Patent No.: US 7,818,966 B2

(45) Date of Patent: Oct. 26, 2010

(54) HYDRAULIC CONTROL VALVE SYSTEM WITH ISOLATED PRESSURE COMPENSATION

(75) Inventors: Andreas S. Pack, Hartland, WI (US); Jason Greenwood, Irlam (GB); Gary Pieper, Eagle, WI (US)

(73) Assignee: HUSCO International, Inc., Waukesha, WI (US)

(*) Notice: Subject to any disclaimer, the term of this patent is extended or adjusted under 35 U.S.C. 154(b) by 501 days.

(21) Appl. No.: 11/971,526

(22) Filed: Jan. 9, 2008

(65) Prior Publication Data

US 2009/0173067 A1 Jul. 9, 2009

(51) Int. Cl.
*F16D 31/02* (2006.01)

(52) U.S. Cl. .......... 60/422

(58) Field of Classification Search .......... 60/422; 91/446, 448

See application file for complete search history.

(56) References Cited

U.S. PATENT DOCUMENTS 4,693,272 A 9/1987 Wilke
5,579,642 A 12/1996 Wilke et al.
5,715,865 A 2/1998 Wilke
5,806,312 A * 9/1998 Kauss et al. .......... 60/422
6,098,403 A 8/2000 Wilke
6,318,079 B1 11/2001 Barber

* cited by examiner

*Primary Examiner*—Michael Leslie
(74) *Attorney, Agent, or Firm*—Quarles & Brady LLP; George E. Haas

(57) ABSTRACT

A hydraulic valve assembly includes a pressure compensating valve in which a compensator spool is slideably received in a bore. A pre-compensator gallery connected to a metering orifice, a preload gallery leading to a hydraulic actuator, an auxiliary pump supply passage, and a load sense passage all open into the bore. The compensator spool moves in response to a pressure differential between the pre-compensator gallery and the load sense passage. That movement selectively opens and closes a first path between the pre-compensator gallery and the a preload gallery, and a second path between the auxiliary supply passage and the load sense passage. Control of these paths maintains a constant pressure drop across the metering orifice and generates a pressure signal that is employed to regulate pressure at an outlet of a pump.

20 Claims, 4 Drawing Sheets

HYDRAULIC CONTROL VALVE SYSTEM WITH ISOLATED PRESSURE COMPENSATION

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to valve assemblies which control hydraulically powered machinery; and more particularly to pressure compensated valves wherein a fixed differential pressure is to be maintained to achieve a uniform flow rate.

2. Description of the Related Art

Agricultural, construction and industrial machinery have components that are moved by hydraulic actuators, such as cylinder and piston arrangements. Application of hydraulic fluid to the hydraulic actuator is often controlled by a valve with spool that is moved by a manually operated lever. Solenoid operated spools also are available. Movement of the spool into various positions within a valve body proportionally varies the flow of pressurized fluid from a pump to one chamber of the cylinder and controls fluid draining from another cylinder chamber. Typically a plurality of valves for operating different hydraulic actuators were combined side by side in sections of a valve assembly.

The speed of a hydraulically driven component on the machine depends upon the cross-sectional areas of control orifices in the spool valve and the pressure drop across those orifices. To facilitate control, pressure compensating hydraulic control systems have been designed to set and maintain the pressure drop. These previous control systems include load sense lines which transmit the pressure at the valve workports to the input of a variable displacement hydraulic pump which supplies pressurized hydraulic fluid in the system. The resulting self-adjustment of the pump output provides an approximately constant pressure drop across a control orifice, the cross-sectional area of which is varied by the machine operator. This facilitates control because, with the pressure drop held constant, the speed of the machine component is determined only by the cross-sectional area of an operator variable metering orifice.

One such prior system is disclosed in U.S. Pat. No. 5,579,642 entitled "Pressure Compensating Hydraulic Control System". That system utilized a chain of shuttle valves to sense the pressure at every powered workport of each valve section and to choose the highest of those workport pressures. The chosen workport pressure of that chain was applied to an isolator valve which connected the control input of the pump to either the pump output or to the system tank depending upon that workport pressure. The isolator valve was contained in a separate, special end section of the valve assembly.

The control pressure applied to the pump's control input also was applied to a separate pressure compensating valve in each valve section. In response to the control pressure, the pressure compensating valve created a substantially fixed differential pressure across the spool by controlling the workport pressure after the fluid flowed through the valve spool.

U.S. Pat. No. 5,892,362 entitled "Hydraulic Control Valve System With Non-Shuttle Pressure Compensator" eliminated the separate isolator valve. In this apparatus, each pressure compensating valve has a poppet and a valve element both of which slide reciprocally in a bore of the valve section. The poppet functions as the prior pressure compensating valve. The valve elements in all the valve sections cooperatively applied the greatest workport pressure to the pump control input. Each valve element also acted on the adjacent poppet in response to that control pressure.

However, that previous valve assembly required two active components in each section's pressure compensating valve. It is desirable to simplify the structure of the pressure compensating mechanism further and reduce its manufacturing complexity.

SUMMARY OF THE INVENTION

A hydraulic system has an array of valve sections that control flow of fluid from a supply line to a plurality of hydraulic actuators. Pressure of the fluid in the supply line from a pump is regulated in response to a control signal. Each valve section includes a workport to which one hydraulic actuator connects and a spool with a metering orifice that is variable to control flow of the fluid from the supply line to the one hydraulic actuator.

A novel a pressure compensation apparatus is provided in which each valve section has a pressure compensating valve. Every pressure compensating valve comprises a compensator bore in which a single compensator spool is slideably located. In some embodiments, the compensator spool may be biased by a main spring.

The compensator bore has a pre-compensator gallery, a preload gallery, an auxiliary supply passage, and a load sense passage. The pre-compensator gallery is in fluid communication with the metering orifice and after passing by the compensator spool fluid flows from the preload gallery to the workport. The auxiliary supply passage is in fluid communication with the supply line. In a preferred embodiment an orifice restricts fluid flow from the supply line into the auxiliary supply passage. The load sense passage is connected to all the valve sections and the control signal is produced is this passage.

The compensator spool is slideably received in the compensator bore. Pressure in the pre-compensator gallery exerts a first force that tends to move the compensator spool in one direction and pressure in the load sense passage exerts a second force that tends to move the compensator spool in an opposite direction. In response to the relative magnitude of the first and second forces, the compensator spool assumes a first position that provides a first path between the pre-compensator gallery and the a preload gallery and a second path between the auxiliary supply passage and the load sense passage. In a second position of the compensator spool, the first path is provided and the second path is not provided. The compensator spool has a third position in which neither the first path nor the second path exists. When used, a main spring biases the compensator spool toward the third position.

In one embodiment of the pressure compensating valve, a pressure chamber is formed in the bore at a first end of the compensator spool, and a first orifice provides a restricted flow path between the load sense passage and the pressure chamber. A check valve optionally may be provided through which fluid flows from the pressure chamber to the load sense passage.

Another configuration of the pressure compensating valve has a damping chamber defined in the bore at a second end of the compensator spool, and a second orifice provides a restricted flow path between the pre-compensator gallery and the damping chamber. This configuration optionally may include a check valve through which fluid flows from the damping chamber to the pre-compensator gallery.

A further variation of the pressure compensating valve includes an isolator spool that is slideable within an isolator bore in the compensator spool. Here the isolator spool selectively opens and closes the second path in response to a pressure differential between the preload gallery and the load sense passage, independent of motion of the compensation spool.

DETAILED DESCRIPTION OF THE INVENTION

Figure 1:
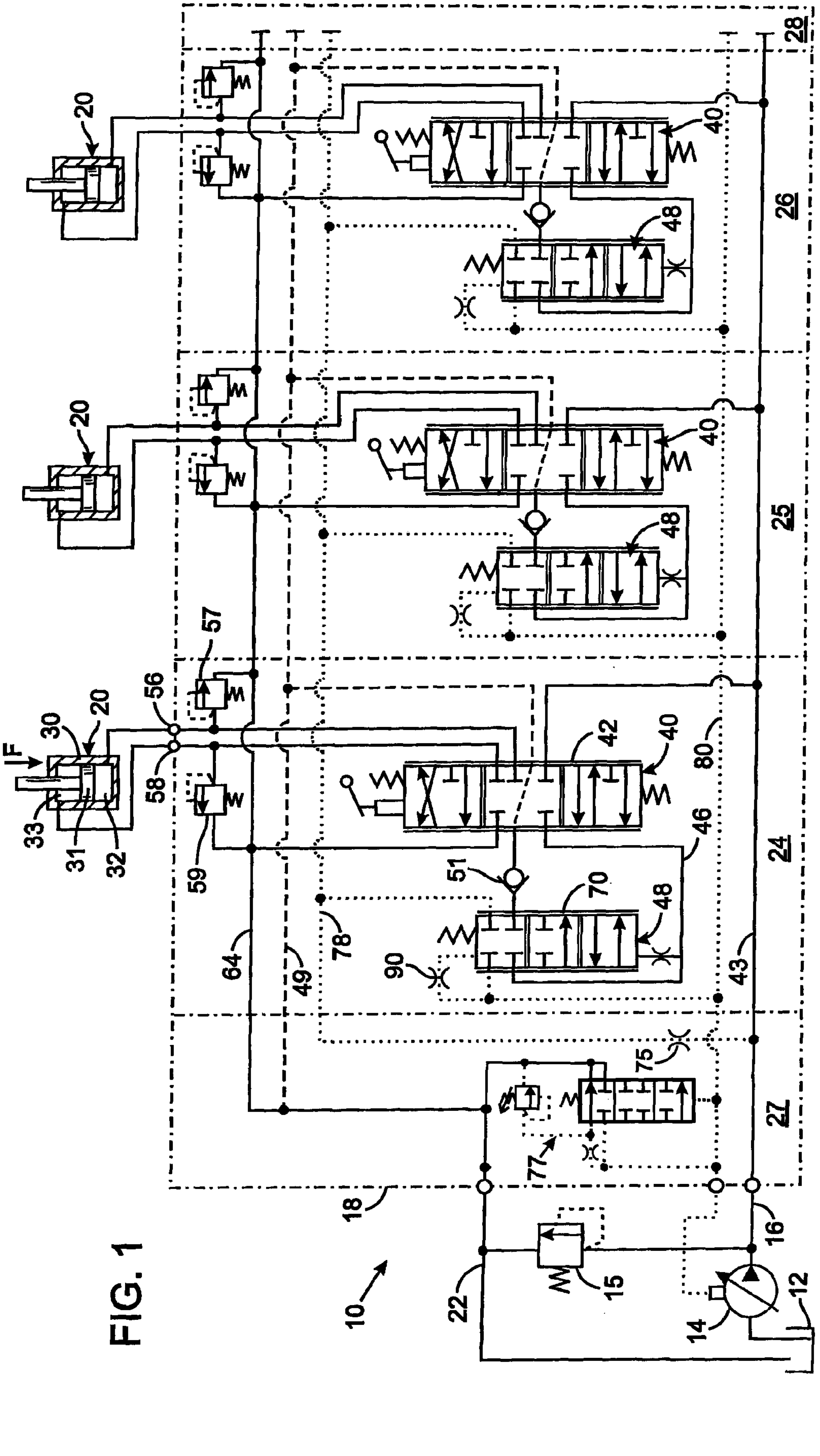
FIG. 1 is a schematic diagram of a hydraulic system that employs a valve assembly having control valves according to the present invention.

With initial reference to FIG. 1, a hydraulic system 10 controls motion of hydraulically powered working members of a machine, such as the boom, arm, and bucket of a backhoe. Hydraulic fluid is held in a reservoir, or tank, 12 from which the fluid is drawn by a conventional variable, load sensing displacement pump 14 and fed under pressure into a supply line 16. Pressure in the supply line is limited by a first pressure relief valve 15. The supply line 16 furnishes the pressurized fluid to a valve assembly 18 that controls the flow of that fluid to a plurality of hydraulic actuators 20. The valve assembly 18 comprises several individual valve sections 24, 25 and 26 interconnected side-by-side between two end sections 27 and 28. Each hydraulic actuator 20 has a cylinder housing 30 containing a piston 31 that divides the housing interior into a head chamber 32 and a rod chamber 33 to which chambers pressurized fluid is applied to move the piston. The fluid returns from those hydraulic actuators back through the valve assembly 18 into a return line 22 that leads to the tank 12.

To facilitate understanding of the invention claimed herein, it is useful to describe basic fluid flow paths with respect to the first valve section 24 in the valve assembly 18. The other valve sections 25 and 26 are constructed and operate in identical manners to section 24, and the following description is applicable to them as well.

Figure 2:
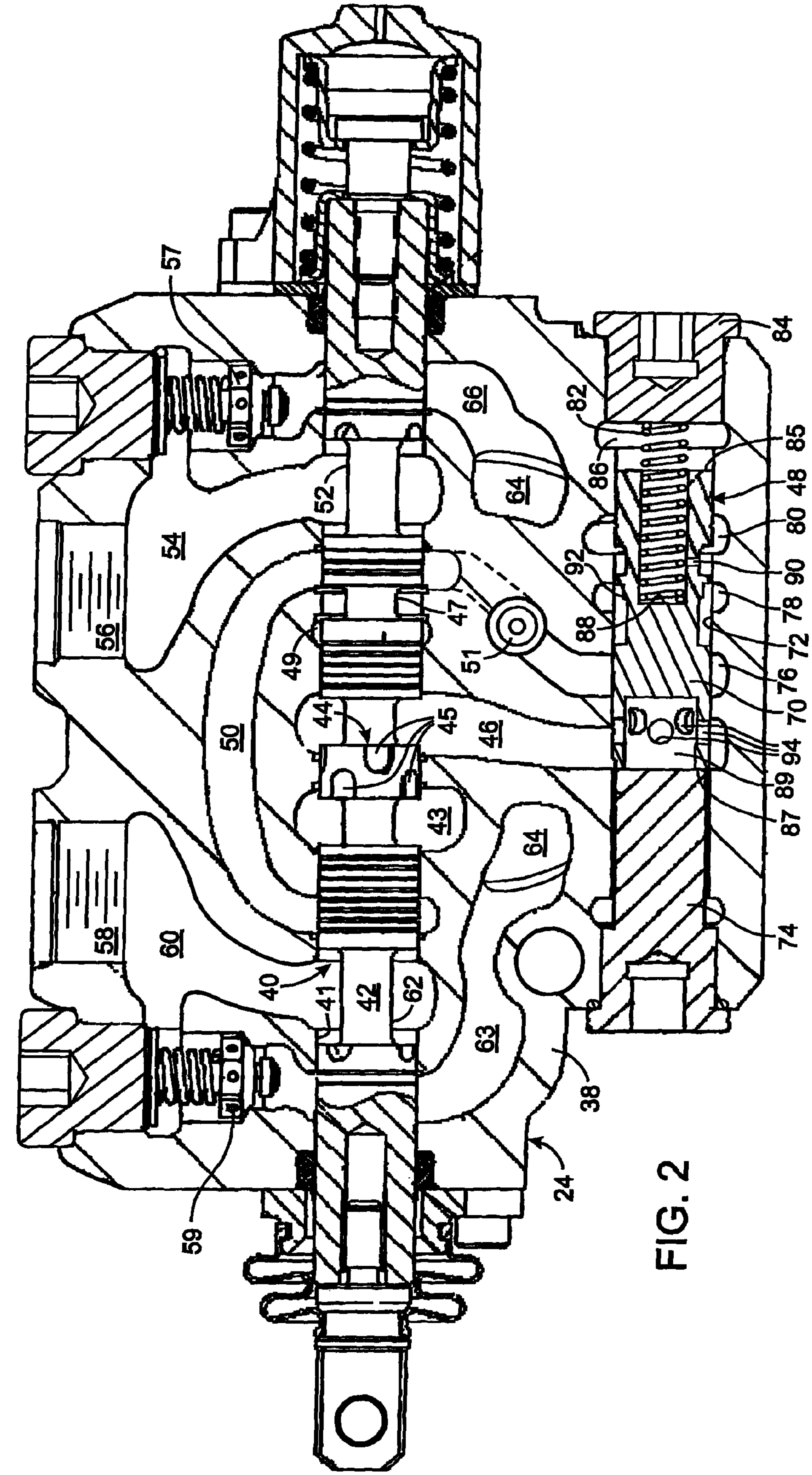
FIG. 2 is a cross section through a section of the valve assembly depicted schematically in FIG. 1 and shows components of a novel pressure compensating valve in one position.

With additional reference to FIG. 2, the first valve section 24 has a body 38 containing a control valve 40 that comprises a control spool 42 which a machine operator moves in reciprocal directions within a first bore 41 in the body. Depending on which direction the control spool 42 is moved, hydraulic fluid, or oil, is directed to the head or rod chamber 32 and 33 of the associated actuator 20 and thereby drives the piston 31 up or down. References herein to directional relationships and movement, such as top and bottom or up and down, refer to the relationship and movement of the components in the orientation illustrated in the drawings, which may not be the orientation of the components in a particular application of the valve assembly 18. The extent to which the machine operator moves the control spool 42 determines the speed of the working member connected to the piston 31.

FIG. 2 depicts the control spool 42 in the centered, closed state of the control valve 40. In this state, fluid flow between the supply and return lines 16 and 22 and the respective actuator 20 is blocked. When the control spool is in a neutral, centered position, a first groove 47 in the control spool 42 provides a pressure relief path from a bridge passage 50 to a low flow sump drain gallery 49 that leads through all the valve sections 24-26 and is connected to the return line 22 at the first end section 27 as shown in FIG. 1. This path also exhausts any pressure that may leak into the bridge passage 50.

To raise the piston 31, the machine operator moves the reciprocal control spool 42 leftward. This opens passages wherein the pump 14 (under the control of the load sensing network to be described later) draws hydraulic fluid from the tank 12 and force it to flow through supply line 16, into a supply passage 43 in the valve body 38. From the supply passage 43 the fluid passes through a metering orifice 44 formed by a set of notches 45 in the control spool 42, a pre-compensator gallery 46 and through a pressure compensating valve 48. In the open state of the pressure compensating valve 48, the hydraulic fluid continues to travel through load check valve 51, the bridge passage 50, a spool groove 52 and a workport passage 54 to a first workport 56 connected to the head chamber 32 in the cylinder housing 30. The pressurized fluid thus applied to the bottom of the piston 31 causes it to move upward, which forces hydraulic fluid out of the rod chamber 33. That latter hydraulic fluid flows into a second workport 58 in the valve body 38, through another workport passage 60, a different spool groove 62, a tank gallery 63 and into a tank passage 64 to which the tank return line 22 is connected. The load check valve 51 is a conventional device that prevents the load acting on the hydraulic actuator 20 from dropping due to gravity before sufficient pressure is developed to lift the load. If pressure at the first workport 56 exceeds a safe level, a first workport relief valve 57 opens to convey that excessive pressure to another tank gallery 66. An identical second workport relief valve 59 releases excessive pressure in the second workport 58 to tank gallery 63.

To move the piston 31 downward, the machine operator slides the control spool 42 rightward which also meters fluid from the supply passage 43 into the bridge passage 50. That hydraulic fluid continues to flow from the bridge passage 50 through spool groove 62 to the second workport 58 and onward to the rod chamber 33 in the cylinder housing 30 thereby forcing the piston downward. The fluid returning from the head chamber 32 to the first workport 56 travels through spool groove 52 and tank gallery 66 into the tank passage 64.

In the absence of a pressure compensation mechanism, the machine operator would have difficulty controlling the speed of the piston 31 and thus the machine member attached to the piston. This difficulty is due to the speed of piston movement being directly related to the hydraulic fluid flow rate, which is determined primarily by two variables—the cross sectional areas of the most restrictive orifices in the flow path and the pressure drops across those orifices. One of the most restrictive orifices is the metering orifice 44 formed by the notches 45 in the control spool 42 and the machine operator is able to control that orifice's cross sectional area by selectively moving the control spool in the bore 41. Although this controls one flow rate determining variable, it provides less than optimum control because the flow rate also is directly proportional to the square root of the total pressure drop in the system, which occurs primarily across the metering orifice 44. For example, increasing a load force F acting on the cylinder piston 31 increases pressure in the head chamber 32, which reduces the difference between that load induced pressure and the pressure provided by the pump 14. Without pressure compensation, this reduction of the total pressure drop reduces the flow rate and thereby the speed of the piston 31 even if the machine operator holds the metering orifice 44 at a constant cross sectional area.

To mitigate this effect, each valve section 24-26 incorporates a pressure compensating valve 48. With reference to FIGS. 1 and 2, the pressure compensating valve 48 has a compensator spool 70 that sealingly slides in a reciprocal manner within a second bore 72 of the valve body 38. The pre-compensator gallery 46 leads from the first bore 41, where it is in direct fluid communication with the metering orifice 44, to what is effectively the inner end of the second bore as defined by an insert 74 which the compensator spool 70 abuts in the illustrated closed position. The terms "direct fluid communication" and "connected directly" as used herein mean that the associated components either open into each other or are connected together by a conduit without any intervening element, such as a valve, an orifice or other device, which restricts or controls the flow of fluid beyond the inherent restriction of any conduit. A preload gallery 76 extends from the second bore 72 to the load check valve 51 that couples the preload gallery to the bridge passage 50 at the first bore 41. An auxiliary supply passage 78 and a load sense passage 80 through the valve assembly 18 intersect the second bores 72 in all the valve sections 24-26. In the first end section 27, the auxiliary supply passage 78 is coupled to the supply passage 43 through an orifice 75 that limits the maximum flow between those passages. The load sense passage 80 is coupled to the tank return line 22 by a pressure compensated drain regulator 77 in the first end section to bleed off pressure in the load sense gallery when all the actuators are inactive, thereby reducing the pump output at that time. The pressure compensated drain regulator 77 incorporates a relief valve which limits pressure in the load sense passage 80 from reaching an unacceptable level.

A plug 84 closes an open end of the second bore 72. A main spring 82 biases a first end 85 of the compensator spool 70 away from the plug 84 so that an opposite second spool end 87 abuts the insert 74. The main spring 82 is located in a pressure chamber 86 formed between the compensator spool 70 and the plug 84. Alternatively, the main spring 82 may be eliminated in which case the compensator spool 70 responds only to a pressure differential. A passage 88 with a damping orifice 90 continuously exists through the compensator spool 70 between the load sense passage 80 and the pressure chamber 86 regardless of the position of the compensator spool along the second bore 72. Thus pressure in the load sense passage 80 always acts on the first end 85 of the compensator spool 70.

Figure 3:
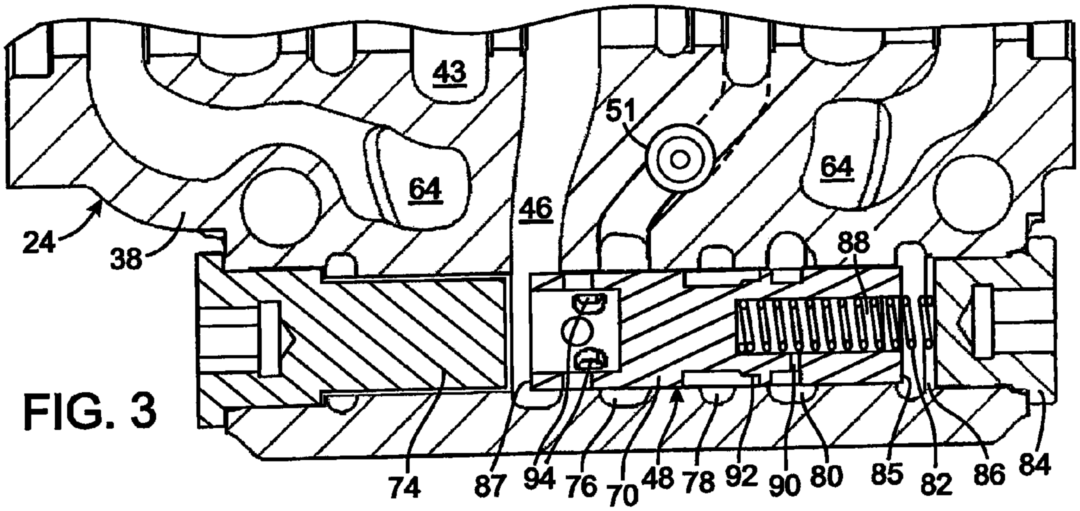
FIG. 3 is a partial cross section showing the pressure compensating valve in another position.

When the control spool 42 is moved in either direction from the center, closed position, the metering orifice 44 opens to provide a path from the supply passage 43 to the pre-compensator gallery 46 leading to the second bore 72. The pressure in the pre-compensator gallery 46 is applied to the second end 87 of the compensator spool 70 which has a cavity 89. That pressure causes the compensator spool 70 to move into a position in which some of the apertures 94 open from the cavity 89 into the preload gallery 76, thereby creating a first path between the pre-compensator gallery 46 and the preload gallery as depicted in FIG. 3. When the compensator spool 70 opens, i.e. moves away from the insert 74, fluid flows from the pre-compensator gallery 46 through apertures 94 and into the preload gallery 76. From the preload gallery 76 the fluid continues through the load check valve 51 into the bridge passage 50 as previously described. Note that in this position the auxiliary supply passage 78 still is closed off from the load sense passage 80.

Figure 4:
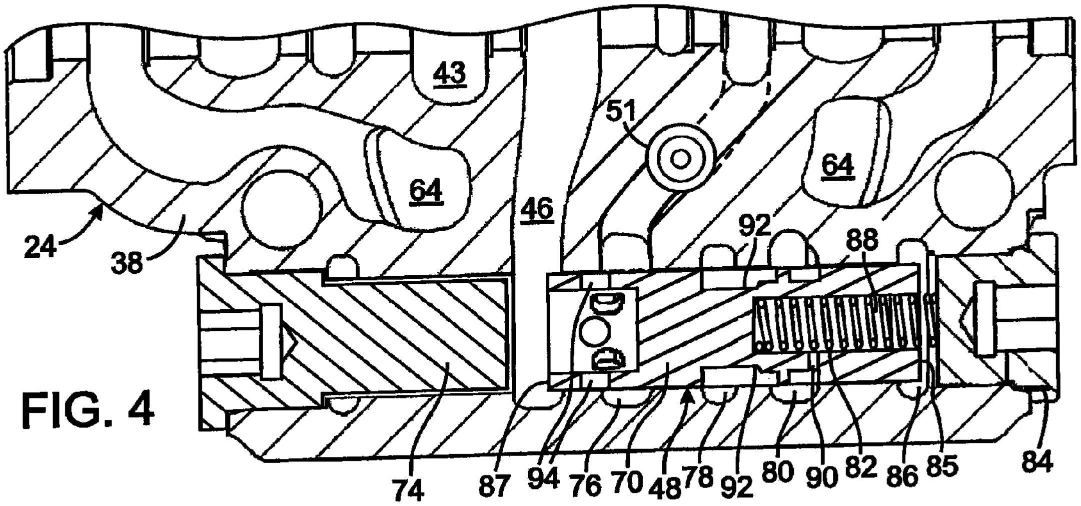
FIG. 4 is a partial cross section illustrating the pressure compensating valve in a further position.

When the actuator 20 associated with the first valve section 24 has the greatest load of all the actuators, pressure in the preload gallery 76 initially is greater than pressure in the load sense passage 80. As a result at that time, pressure acting on the second end 87 of the compensator spool 70 exceeds the pressure acting on its first end 85. That pressure differential causes the compensator spool 70 to move to a farther rightward position shown in FIG. 4, where a set of load sense metering notches 92 open a second path from the auxiliary supply passage 78 to the load sense passage 80. This applies the pump outlet pressure to the load sense passage 80.

The pressure in the load sense passage 80 is conveyed back through other sections 24 and 27 of the valve assembly 18 to the control input of the pump 14. The increased pressure in the load sense passage 80 will be transmitted to the pressure chamber 86 via the damping orifice 90. The pump 14 responds to the increased load sense passage pressure by increasing the outlet pressure applied to the supply passage 43 and auxiliary supply passage 78, which in turn is transmitted through the pressure compensating valve 48 to the load sense passage 80. The increased pressure in the load sense passage 80 then is transmitted farther to the pressure chamber 86 via the damping orifice 90. The damping orifice 90 restricts the rate of that pressure transmission which softens the motion of the compensator spool 70 to reduce instabilities common in mobile hydraulic systems. In this second position, the first path between the between the pre-compensator gallery 46 and the preload gallery remains open.

The pressure compensating valve 48 balances pressure in the pre-compensator gallery 46 against the load sense pressure from passage 80 that acts on the first end 85 of the compensator spool 70. The compensator spool 70 reaches an equilibrium position when the load sense metering notches 92 open far enough to achieve a pressure balance.

Figure 5:
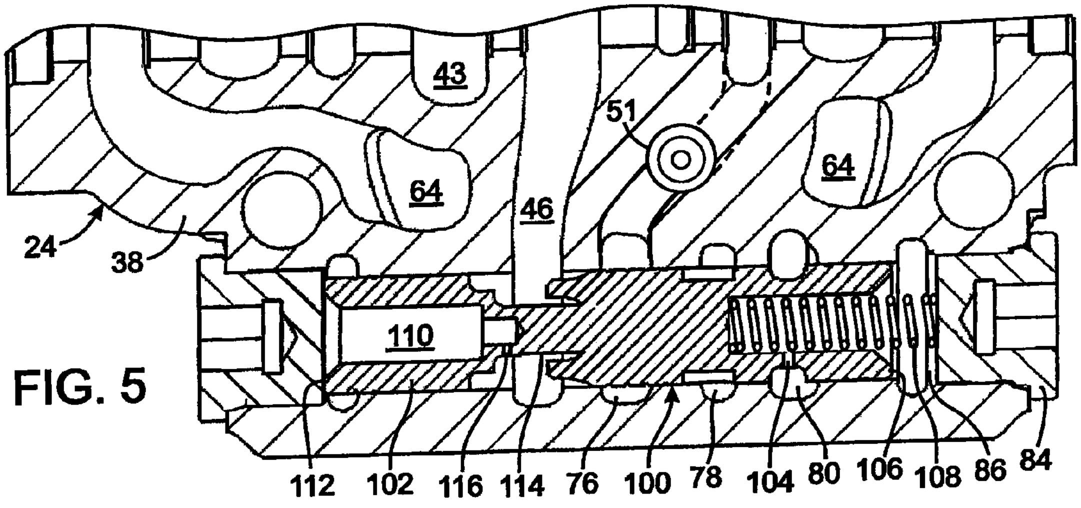
FIG. 5 is a partial cross section illustrating a second embodiment of the pressure compensating valve.

FIG. 5 illustrates a second embodiment of a pressure compensating valve 100. This valve has a compensator spool 102 with a section that provides paths between the pre-compensator gallery 46, the preload gallery 76, the auxiliary supply passage 78 and the load sense passage 80 in the valve body 38, as described with respect to the compensator spool 70 in FIG. 2. As with that other spool, a first damping orifice 104 extends between the load sense passage 80 and the pressure chamber 86 at a first end 106 of the compensator spool 102 and a main spring 108 biases the compensator spool 102 into the illustrated closed position.

In addition, the compensator spool 102 has a damping chamber 110 at its opposite second end 112 and an intermediate annular groove 114 that continuously communicates with the pre-compensator gallery 46 in all positions of the spool. A second damping orifice 116 provides a path between the intermediate annular groove 114 and the damping chamber 110, while restricting fluid flow in both directions there between.

When the control spool 42 opens and pressurized supply fluid is conveyed into the pre-compensator gallery 46, the pressure of that fluid forces the compensator spool 102 rightward in the drawing in the same manner as compensator spool 70 in FIG. 2. That motion is dampened by the first damping orifice 104 through which fluid has to flow from the pressure chamber 86 slowing the rightward motion. Thereafter when pressure in the pressure chamber 86 becomes greater than pressure in the pre-compensator gallery 46, the compensator spool 102 tends to move to the left. This motion is dampened by the second damping orifice 116 which limits the rate at which fluid is able to exit the damping chamber 110.

Figure 6:
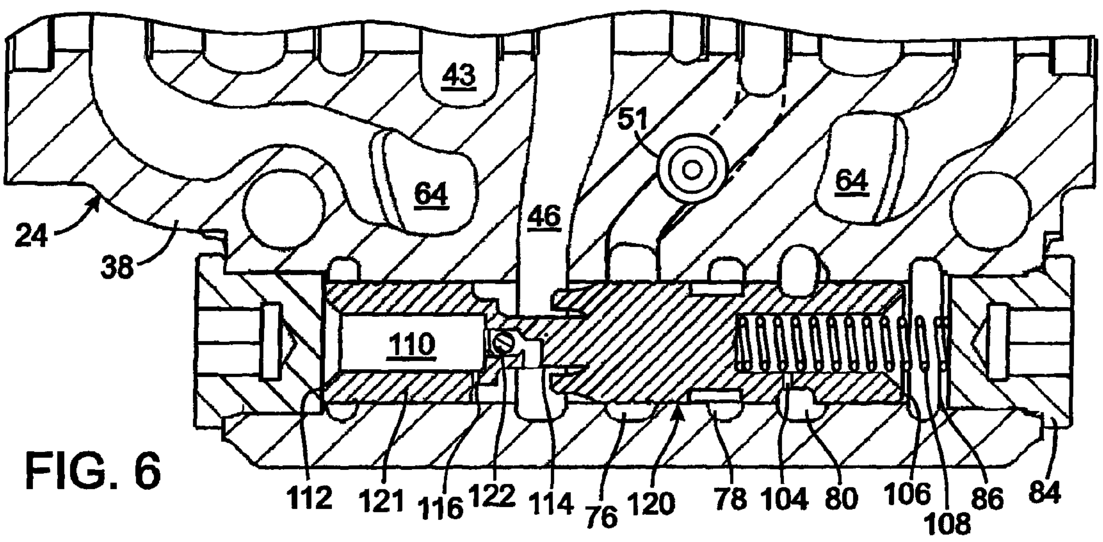
FIG. 6 is a partial cross section illustrating a third embodiment of the pressure compensating valve.

FIG. 6 depicts a third pressure compensating valve 120 with a third compensator spool 121 having many of the same elements as the second compensator spool 102 that have been assigned identical reference numerals. The distinction is that in addition to the second damping orifice 116, a check valve 122 also connects the intermediate annular groove 114 to the damping chamber 110. Fluid cannot flow through the check valve 122 in the direction from the damping chamber 110 to the pre-compensator gallery 46, thus flow in that direction is restricted through the second damping orifice 116. This dampens leftward motion of the compensator spool 102, which closes the pressure compensating valve 120. However, the combination of the check valve 122 and the second damping orifice 116 provides a larger path through which fluid flows in the opposite direction from pre-compensator gallery 46 into the damping chamber 110. As a result, there is less damping of the compensator spool 102 in the rightward, or opening, direction.

Figure 7:
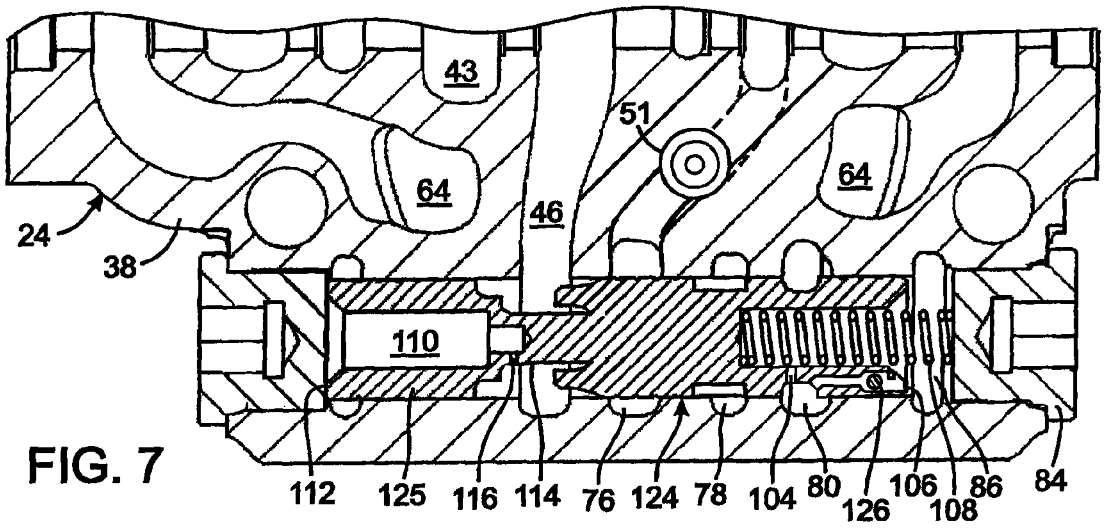
FIG. 7 is a partial cross section illustrating a fourth embodiment of the pressure compensating valve.

With reference to FIG. 7, a fourth pressure compensating valve 124 has a fourth compensator spool 125 is similar to the second compensator spool 102 with the addition of a check valve 126. This check valve 126 permits fluid flow only in a direction from the load sense passage 80 into the pressure chamber 86. Flow in the opposite direction is limited to traveling through the first damping orifice 104. Thus rightward motion of the compensator spool 102 that opens the pressure compensating valve 125 is dampened relative to the leftward closing motion.

Figure 8:
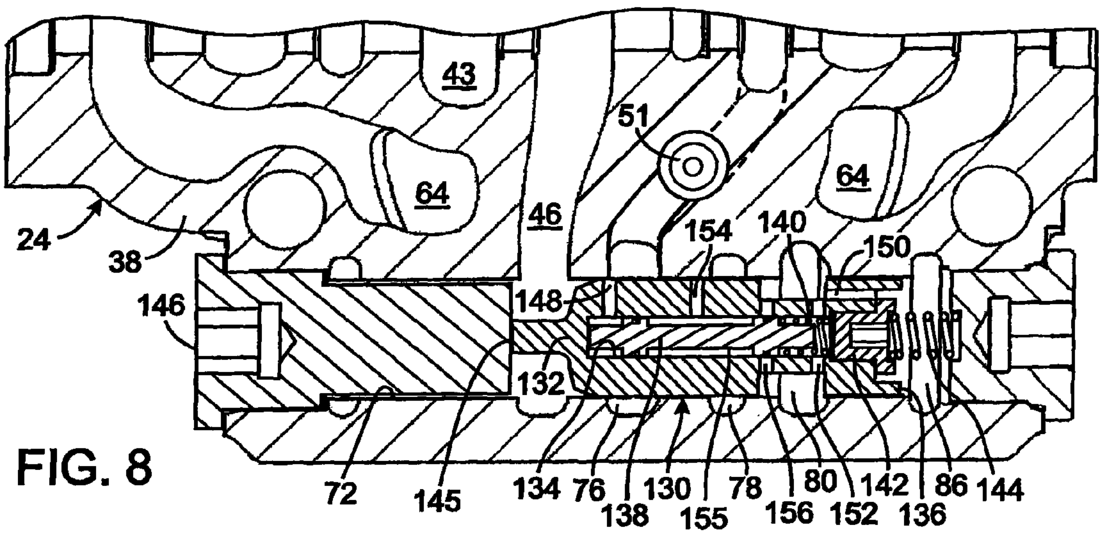
FIG. 8 is a partial cross section illustrating a fifth embodiment of the pressure compensating valve.

FIG. 8 illustrates a fifth pressure compensating valve 130 that incorporates an internal isolator spool. Here a fifth compensator spool 132 is slideably received in the second bore 72 of the valve body 38 and has a first end first end 136 that is biased by a main spring 144 which forces the opposite end 145 against a plug 146 in the second bore/ The fifth compensator spool 132 has an isolator bore 134 extending inward from a first end 136 at the pressure chamber 86. An isolator spool 138, within the isolator bore 134, is biased away from the first end 136 by an isolator spring 140 that abuts a cap 142 which is threaded into the isolator bore.

When the control spool 42 opens and pressurized supply fluid is conveyed into the pre-compensator gallery 46, the resultant pressure forces the compensator spool 132 away from the illustrated closed state allowing that fluid to flow into the preload gallery 76. The resultant increasing pressure in the preload gallery 76 passes through a first aperture 148 into the closed end of the isolator bore 134 where that pressure acts on the adjacent end of the isolator spool 138. The pressure in the load sense passage 80 is conveyed through a longitudinal second aperture 150 in the compensator spool 132 to the pressure chamber 86 and via a transverse third aperture 152 into the chamber containing the isolator spring 140. Pressure in that chamber acts on another end of the isolator spool 138.

The fifth pressure compensating valve 130 with the internal isolator spool 138 opens a path between the auxiliary supply passage 78 and the load sense passage 80 faster than with the other embodiments. This is accomplished by the relatively short travel distance of the isolator spool 138. This action provides a faster response time and smoothes load sensing transitions when the valve section that is driving the greatest load changes. This functionality also permits the compensator spool 132 to have a longer travel which allows a larger opening between the pre-compensator gallery 46 and the preload gallery 76 that results is a lower pressure drop for a given flow rate.

When only the actuator 20 connected to the described first valve section 24 is being operated, greater pressure from the preload gallery 76 causes compensator spool 132 and the isolator spool 138 to move rightward into positions in which a path is opened from the auxiliary supply passage 78 into the load sense passage 80. Specifically that path leads from the auxiliary supply passage 78 through a fourth aperture 154, a central groove 155 around the isolator spool 138, and a fifth aperture 156 into the load sense passage 80. Fluid flowing through that path applies the supply pressure to the load sense passage 80 and through the longitudinal second aperture 150 to the pressure chamber 86.

When two or more actuators are being operated simultaneously, the isolator spool 138 in the valve section for the actuator with the greatest load is opened. That valve section determines the level of pressure applied to the load sense passage 80. The isolator spools 138 in the other valve sections (those driving smaller loads) remain closed due to the combined force from the greater pressure in the load sense passage 80 and the isolator spring 140.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. In a hydraulic system having an array of valve sections that control flow of fluid from a supply line to a plurality of hydraulic actuators, wherein pressure of the fluid in the supply line is regulated in response to a control signal, and each valve section has a workport to which one hydraulic actuator connects and having a spool with a metering orifice that is variable to control flow of the fluid from the supply line to the one hydraulic actuator; a pressure compensation apparatus comprising:

each valve section having a pressure compensating valve that comprises:

(a) a compensator bore having a pre-compensator gallery in fluid communication with the metering orifice, a preload gallery from which fluid flows to the workport, an auxiliary supply passage connected to the supply line, and a load sense passage that is connected to all the valve sections and in which the control signal is produced;

(b) a compensator spool slideably located in the compensator bore wherein pressure in the pre-compensator gallery exerts a first force that tends to move the compensator spool in one direction and pressure in the load sense passage exerts a second force that tends to move the compensator spool in an opposite direction, in response to the first and second forces the compensator spool having a first position that provides a first path between the pre-compensator gallery and the preload gallery and a second path between the auxiliary supply passage and the load sense passage, a second position in which the first path is provided and the second path is not provided, and a third position in which neither the first path nor the second path is provided; and a main spring biasing the compensator spool into the third position.

2. The pressure compensation apparatus as recited in claim 1 wherein a pressure chamber is formed in the bore at a first end of the compensator spool and a first orifice provides a restricted flow path between the load sense passage and the pressure chamber.

3. The pressure compensation apparatus as recited in claim 2 wherein the first orifice is formed in the compensator spool.

4. The pressure compensation apparatus as recited in claim 2 further comprising a check valve through which fluid flows to the pressure chamber from the load sense passage.

5. The pressure compensation apparatus as recited in claim 2 further comprising a damping chamber formed in the bore at a second end of the compensator spool; and a second orifice provides a restricted flow path between the pre-compensator gallery and the damping chamber.

6. The pressure compensation apparatus as recited in claim 5 further comprising a check valve through which fluid flows to the damping chamber from the pre-compensator gallery.

7. The pressure compensation apparatus as recited in claim 1 further comprising an isolator spool slideable within an isolator bore in the compensator spool, wherein the isolator spool selectively opens and closes the second path in response to a pressure differential between the preload gallery and the load sense passage.

8. The pressure compensation apparatus as recited in claim 7 further comprising an isolator spring biasing the isolator spool to close the second path.

9. The pressure compensation apparatus as recited in claim 1 wherein the first path is at least partially formed by an aperture in the compensator spool.

10. The pressure compensation apparatus as recited in claim 1 wherein the second path is at least partially formed by a notch in the compensator spool.

11. The pressure compensation apparatus as recited in claim 1 further comprising a load check valve controlling fluid flow between the preload gallery and the workport.

12. In a hydraulic system having an array of valve sections that control flow of fluid from a pump to a plurality of hydraulic actuators, wherein pressure of the fluid from the pump is regulated by a mechanism in response to a control signal, and each valve section has a workport to which one hydraulic actuator connects and having a spool with a metering orifice that is variable to control flow of the fluid from the pump to the one hydraulic actuator; a pressure compensation apparatus comprising:

each valve section having compensator spool slideably located in a bore thereby defining a pressure chamber at a first end of the compensator spool and a pre-compensator gallery at a second end of the compensator spool, wherein a preload gallery, an auxiliary supply passage and a load sense passage all open into the bore with fluid flowing from the preload gallery to the workport, the auxiliary supply passage connected to an outlet of the pump, and the load sense passage extending into all the valve sections and providing a pressure signal that is employed to control pressure at the outlet of the pump, an orifice connects the load sense passage to the pressure chamber, the compensator spool having a first position that provides a first path between the pre-compensator gallery and the preload gallery and a second path between the auxiliary supply passage and the load sense passage, a second position in which the first path is provided and the second path is not provided, and a third position in which neither the first path nor the second path is provided; and a main spring biasing the compensator spool into the third position.

13. The pressure compensation apparatus as recited in claim 12 wherein the first orifice is formed in the compensator spool.

14. The pressure compensation apparatus as recited in claim 12 further comprising a check valve through which fluid flows from the pressure chamber to the load sense passage.

15. The pressure compensation apparatus as recited in claim 12 further comprising:

an isolator spool slideable within an isolator bore in the compensator spool, wherein the isolator spool selectively opens and closes the second path in response to a pressure differential between the preload gallery and the load sense passage; and an isolator spring biasing the isolator spool to close the second path.

16. The pressure compensation apparatus as recited in claim 12 wherein the first path is at least partially formed by an aperture in the compensator spool.

17. The pressure compensation apparatus as recited in claim 12 wherein the second path is at least partially formed by a notch in the compensator spool.

18. In a hydraulic system having an array of valve sections that control flow of fluid from a pump to a plurality of hydraulic actuators, wherein pressure of the fluid from the pump is regulated by a mechanism in response to a control signal, and each valve section has a workport to which one hydraulic actuator connects and having a spool with a metering orifice that is variable to control flow of the fluid from the pump to the one hydraulic actuator; a pressure compensation apparatus comprising:

each valve section having compensator spool slideably located in a bore thereby defining a pressure chamber at a first end of the compensator spool and a damping chamber at a second end of the compensator spool, wherein a pre-compensator gallery, a preload gallery, an auxiliary supply passage and a load sense passage all open into the bore with fluid flowing from the preload gallery to the workport, the auxiliary supply passage connected to an outlet of the pump, and the load sense passage extending into all the valve sections and providing a pressure signal that is employed to control pressure at the outlet of the pump, a first orifice connects the pre-compensator gallery to the pressure chamber and a second orifice connects the load sense passage to the damping chamber, the compensator spool having a first position that provides a first path between the pre-compensator gallery and the preload gallery and a second path between the auxiliary supply passage and the load sense passage, a second position in which the first path is provided and the second path is not provided, and a third position in which neither the first path nor the second path is provided; and a main spring biasing the compensator spool into the third position.

19. The pressure compensation apparatus as recited in claim 18 further comprising a check valve through which fluid flows to the damping chamber from the pre-compensator gallery.

20. The pressure compensation apparatus as recited in claim 18 further comprising a load check valve controlling fluid flow between the preload gallery and the workport.

* * * * *